UNITED STATES PATENT OFFICE.

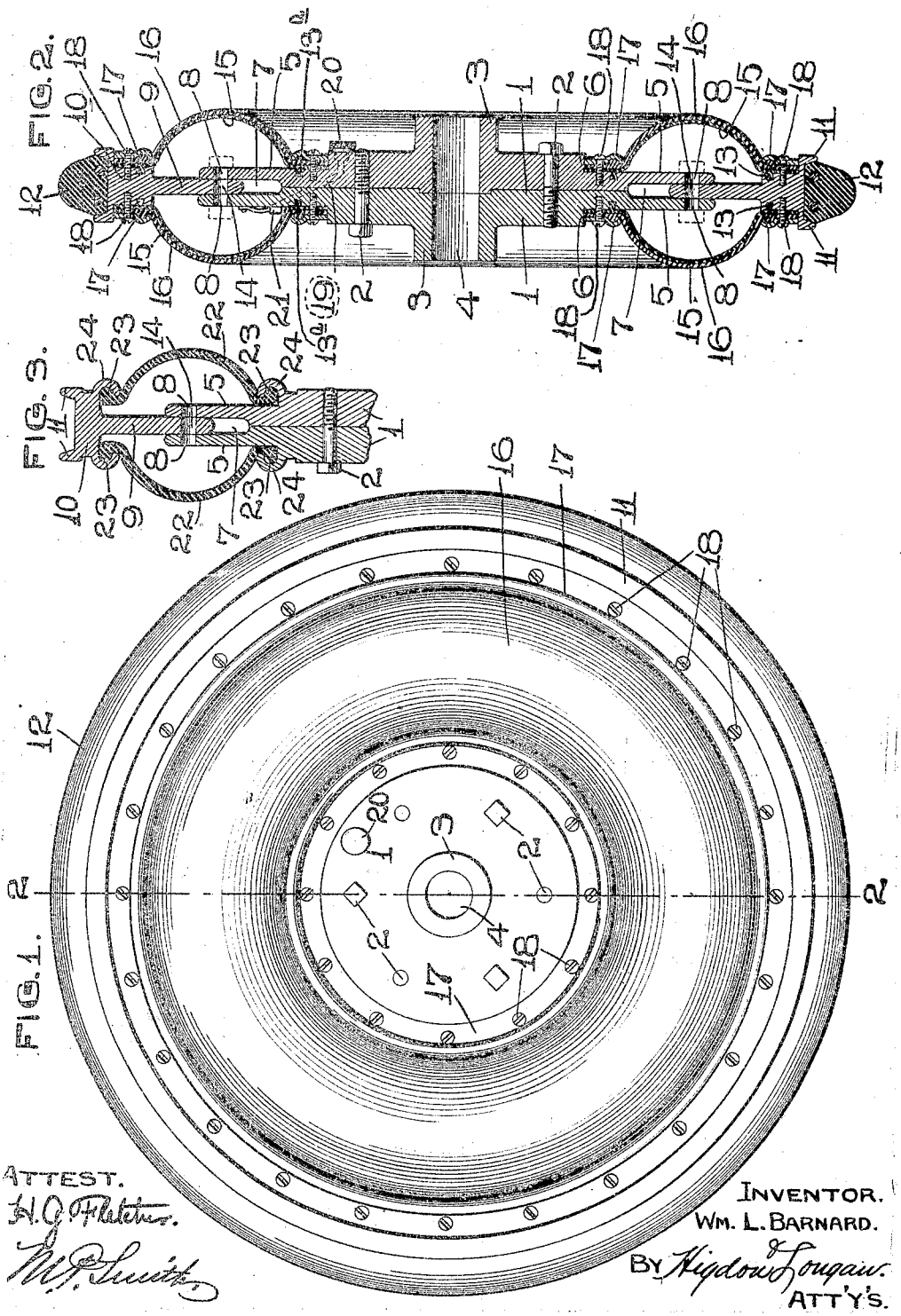

WILLIAM L. BARNARD, OF ST. LOUIS, MISSOURI.

PNEUMATIC WHEEL.

No. 845,842.    Specification of Letters Patent.    Patented March 5, 1907.

Application filed November 25, 1905. Serial No. 289,529.

*To all whom it may concern:*

Be it known that I, WILLIAM L. BARNARD, a citizen of the United States, and a resident of St. Louis, Missouri, have invented certain new and useful Improvements in Pneumatic Wheels, of which the following is a specification containing a full, clear, and exact description, reference being had to the accompanying drawings, forming a part hereof.

My invention relates to a pneumatic wheel; and the object of my invention is to construct a wheel with a solid tire and with a pneumatic ring or a cushion between the tire and the wheel-hub which will to all purposes perform the functions of pneumatic tires, thus providing for a yielding resilient motion between the wheel-hubs and the ground. This arrangement of a pneumatic ring or cushion does away with the possibility or danger of the vehicle-wheel tire becoming punctured, as this pneumatic ring or cushion is arranged some little distance from the vehicle-tire and does not come in contact with the ground.

To the above purposes my invention consists in certain novel features of construction and arrangement of parts, which will be hereinafter more fully described, pointed out in the claims, and illustrated in the accompanying drawings, in which—

Figure 1 is a side elevation of a pneumatic wheel constructed in accordance with my invention. Fig. 2 is a vertical section taken on the line 2 2 of Fig. 1. Fig. 3 is a detail section showing a modified form of the pneumatic ring or cushion.

Referring by numerals to the accompanying drawings, the main body of the wheel comprises a pair of disks 1, held together by bolts 2 or in any suitable manner and provided at their centers with the hubs 3, through which is formed the journal-bearing 4, in which the journal of the axle is arranged. These disks are circular, and a portion of their outer faces adjacent to their edges is cut away, as indicated by 5, thus forming the annular shoulders 6. The inner faces of the outer edges of the disks are cut away so as to form an annular space or slot 7, that extends entirely around between the edges of the disks 1. Formed through the outer edges of the disks are the pairs of coinciding apertures 8.

9 indicates the outer portion of the wheel, which is in the form of a ring, the inner part thereof being of such thickness as that it will readily slide in the space 7 between the edges of the disks 1. Formed integral with the outer edge of this ring is a felly 10, that is provided on its outer face with the integral outwardly-projecting rims 11, in which is arranged an ordinary solid-rubber tire 12. Formed in the side faces of the felly 10 are the continuous dovetail grooves 13, and similar dovetail grooves 13ª are formed in the outer faces of the thin outer edges of the disks 1. Formed through the inner edge of the ring 9 are suitably-arranged apertures 14, which are adapted to coincide with the apertures 8, that are formed in the outer edges of the disks 1. Arranged on each face of the wheel so constructed between the rims 11 and the shoulders 6 are inner sections 15, of flexible elastic material, such as rubber, and said material extends into the dovetail grooves 13 and 13ª, thus rigidly connecting said inner sections to the felly 10 and to the disks 1.

16 indicates outer flexible sections, of rubber, leather, or analogous material, which overlie the inner sections 15, and the edges of said sections engage against the rims 11 and against the shoulders 6. Positioned against the edges of these sections 16 on the sides of the felly 10 and on the sides of the disks 1 beside the shoulders 6 are the retaining-rings 17, which are clamped in position by means of screws 18. Thus it will be seen how the ring 9 and parts carried thereby is adapted to slide vertically relatively to the disks 1, owing to the flexibility of the sections 15 and 16. Formed through the disks 1 at any suitable point is an air-inlet passage-way 19, that leads from a point outside the shoulders 6 to a point between the pairs of flexible sections 15 and 16. The outer end of this passage-way is normally closed by a screw-cap 20, and the inner end is provided with a suitable inlet-valve 21. This last construction provides for the introduction of air into the space between the flexible sections 15 and 16.

In the modified construction seen in Fig. 3 the pairs of sections 15 and 16 are dispensed with and a single flexible section, such as 22, is arranged between each shoulder 6 and each side of the felly 10, the edges of each section being provided with a rib, such as 23, which is held beneath a curved clencher 24, that is formed integral with each side of the felly 10 and with each disk 1 at the shoulder 6.

When a wheel of my improved construction is in use, the proper amount of air is pumped into the space between the pairs of sections 15 and 16, and as said air is compressed in this space a pneumatic ring or cushion is formed that extends entirely around the wheel between the hub and the felly. When said wheel is in use and travels over the ground, the inner portion or the disks 1 will slide vertically a short distance relatively to the outer ring 9, and owing to the connection of these two parts by the pairs of flexible sections a resilient cushioning effect is produced which is in every way similar to the result obtained by the use of a wheel having a pneumatic tire. The ring 9 cannot become detached from between the outer edges of the disks 1 and the downward limit of movement of said disks relatively to the ring 9 is limited by the inner edge of said ring 9 coming in contact with the shoulders at the inner end of the space 7. Should either of the pairs of sections 15 and 16 become punctured while the wheel is in use so as to render it inoperative, a number of the screws 18 may be removed from the retaining-rings 17 to allow bolts to be inserted through the corresponding apertures 8 and 14, thus locking the ring 9 to the disks 1, and said wheel will thus be made temporarily serviceable until the punctured sections 15 and 16 can be replaced by new sections.

A pneumatic wheel of my improved construction is simple, strong, and durable, easily assembled or taken apart, and is applicable for use on all classes of vehicles.

It will be readily understood that the flexible sections 15 and 16 may be replaced by a single thickness of flexible material.

I claim—

1. A pneumatic wheel, constructed with a pair of disks rigidly fixed together, there being an annular space formed between the outer edges of the disks, a ring arranged to slide in the annular space between the outer edges of the disks, a felly integral with the ring, a tire carried by the felly, there being grooves formed in the outer faces of the felly and there being grooves formed in the outer faces of the disks, inflatable flexible sections arranged on each side of the disk and felly in such a manner as that portions of said flexible sections occupy the grooves in the disk and felly, and retaining-rings clamped upon the disks and felly over the edges of the inflatable sections; substantially as specified.

2. A pneumatic wheel, constructed with a pair of disks rigidly fixed together, there being an annular space formed between the outer edges of the disks, a ring arranged to slide in the annular space between the outer edges of the disks, the interior diameter of which ring is less than the exterior diameter of the disks, a felly integral with the ring, a tire carried by the felly, there being grooves formed in the outer faces of the felly and there being grooves formed in the outer faces of the disks, inflatable flexible sections arranged on each side of the disk and felly in such a manner as that portions of said flexible sections occupy the grooves in the disk and felly, retaining-rings clamped upon the disks and felly over the edges of the inflatable sections, and means whereby air under pressure is delivered through the disks between the inflatable sections; substantially as specified.

In testimony whereof I have signed my name to this specification in presence of two subscribing witnesses.

WILLIAM L. BARNARD.

Witnesses:
M. P. SMITH,
JOHN C. HIGDON.